United States Patent
Kikuchi

(10) Patent No.: US 7,639,378 B2
(45) Date of Patent: Dec. 29, 2009

(54) PRINTING SYSTEM AND DOCUMENT MANAGEMENT SYSTEM

(75) Inventor: Hiroshi Kikuchi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 11/351,230

(22) Filed: Feb. 9, 2006

(65) Prior Publication Data

US 2006/0187479 A1 Aug. 24, 2006

(30) Foreign Application Priority Data

Feb. 18, 2005 (JP) .............................. 2005-043145

(51) Int. Cl.
*G06F 3/12* (2006.01)
(52) U.S. Cl. ..................... 358/1.13; 358/1.1; 358/1.15
(58) Field of Classification Search ........... 358/1.1–1.9, 358/1.11–1.18, 3.04, 512
See application file for complete search history.

(56) References Cited

U.S. PATENT DOCUMENTS

| 2002/0048036 A1 | 4/2002 | Nakagawa et al. | |
| 2003/0112456 A1 | 6/2003 | Tomita et al. | 358/1.13 |
| 2003/0217201 A1 | 11/2003 | Gargi et al. | |
| 2004/0032611 A1* | 2/2004 | Daly et al. | 358/1.13 |
| 2004/0223167 A1* | 11/2004 | Yu | 358/1.1 |
| 2004/0257609 A1 | 12/2004 | Tokimatsu | |

FOREIGN PATENT DOCUMENTS

| JP | 10-207668 A | 8/1998 |
| JP | 2000-118095 | 4/2000 |
| JP | 2000-222159 | 8/2000 |
| JP | 2001-256007 | 9/2001 |
| JP | 2003-091389 | 3/2003 |
| JP | 2003-140854 | 5/2003 |
| JP | 2003-330638 | 11/2003 |

OTHER PUBLICATIONS

The above reference was cited in a Apr. 27, 2009 Japanese Office Action that issued in Japanese Patent Application No. 2005-043145, which is enclosed without English Translation.

* cited by examiner

*Primary Examiner*—Benny Q Tieu
*Assistant Examiner*—Quyen Ngo
(74) *Attorney, Agent, or Firm*—Cowan, Liebowitz & Latman, P.C.

(57) ABSTRACT

According to the present invention, a printing system comprises a conversion unit which performs conversion processing for print data by using a filter module specified by filter information attached to the print data; a history storage unit which stores filter information for specifying the filter module used by said conversion unit; and a filter re-designation unit which reads out the filter information stored by said history storage unit and attaches the filter information to the print data.

9 Claims, 15 Drawing Sheets

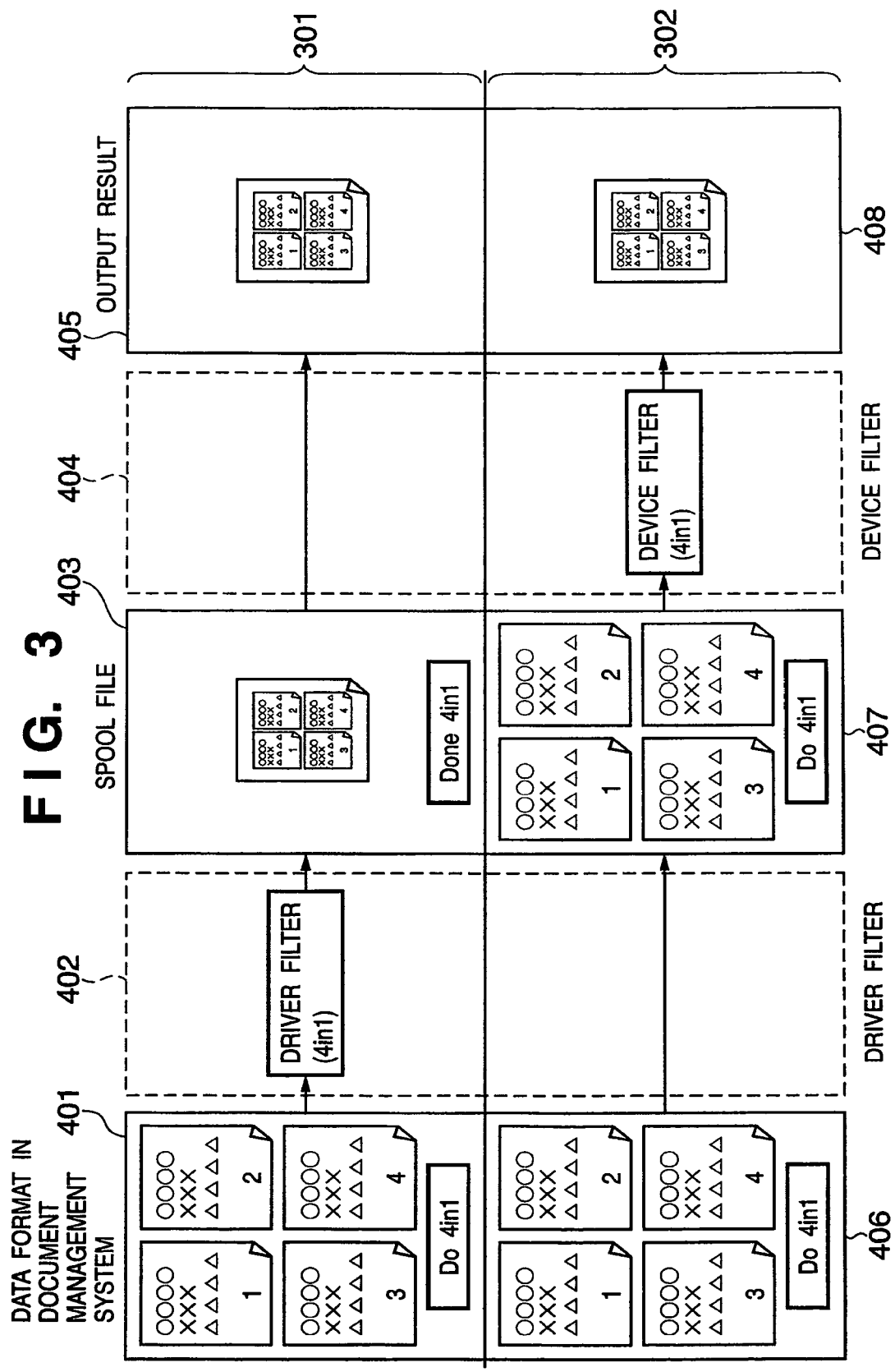

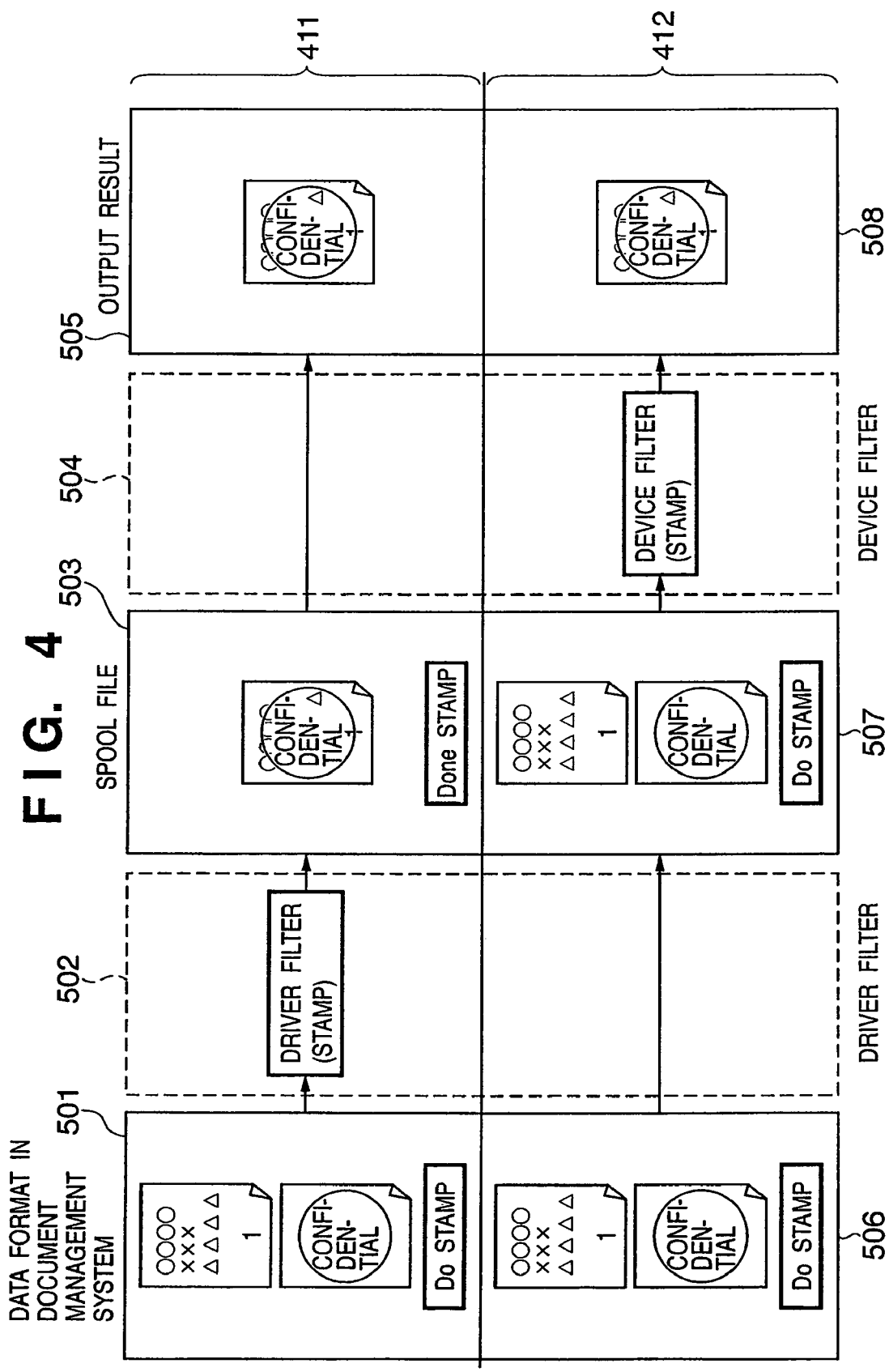

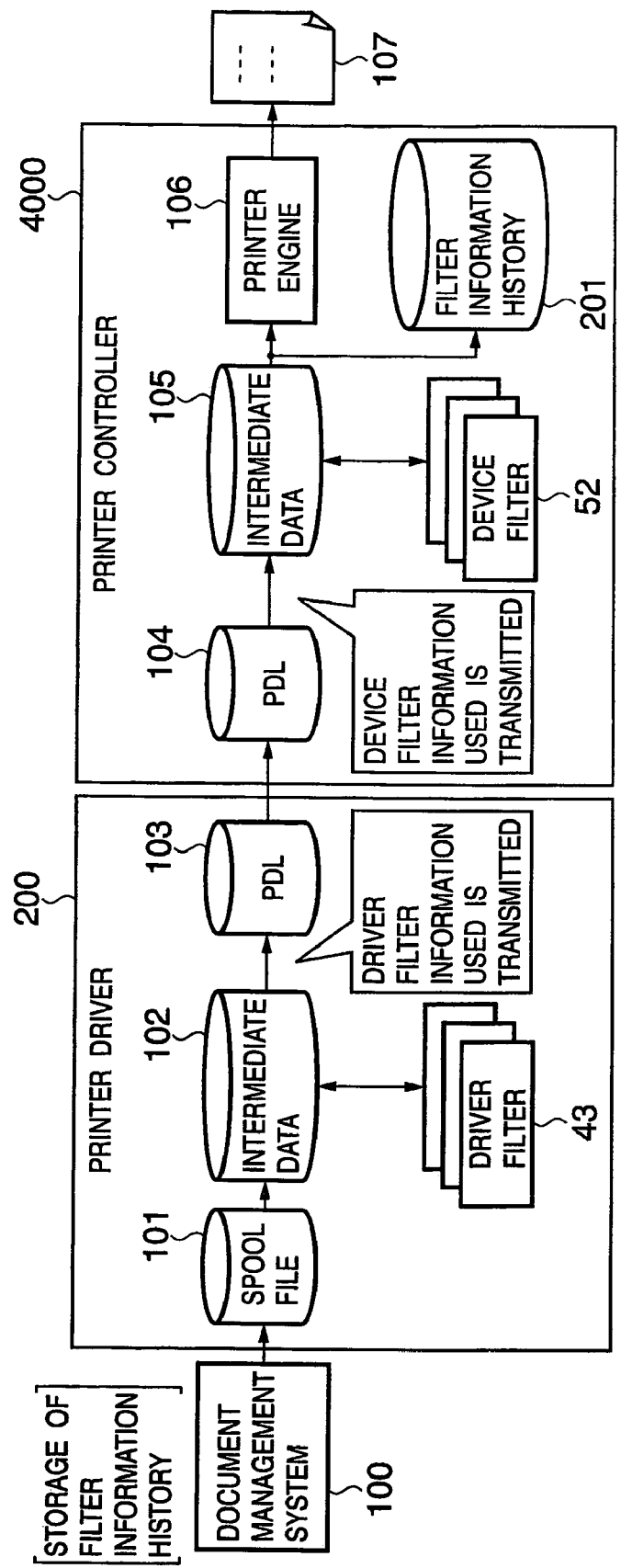

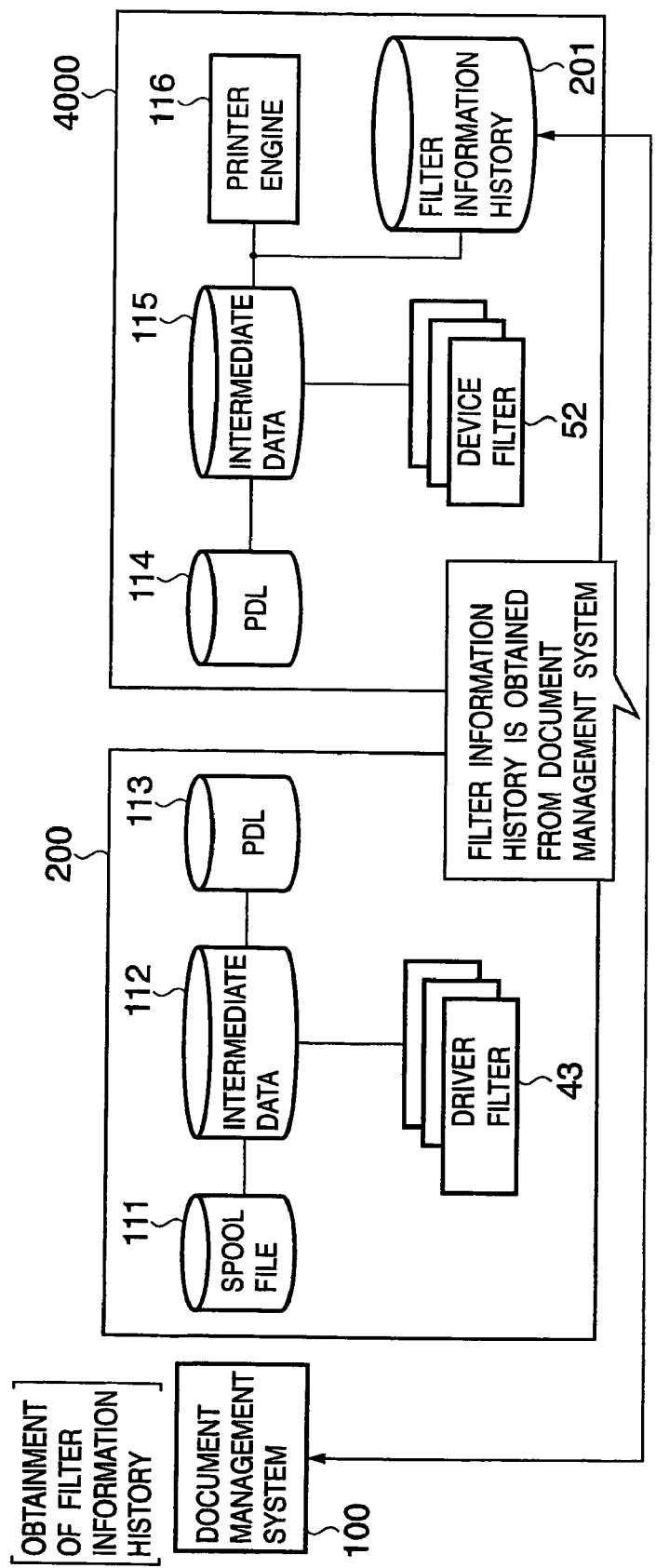

PRINTING SYSTEM AND DOCUMENT MANAGEMENT SYSTEM

FIELD OF THE INVENTION

The present invention relates to a document management system and printing system capable of printing in accordance with print settings which designate document data.

BACKGROUND OF THE INVENTION

In a conventional printing system, the user must input the same settings as previous print settings to a printer driver when requiring exactly the same output result as an output result obtained at print settings temporarily input to the UI of the printer driver. Elements (items) which can be set by the printer driver are complicated, and setting to obtain the same print result as a previous one is very troublesome.

To solve this problem, according to techniques disclosed in Japanese Patent Laid-Open No. 2001-256007 (FIGS. 3 and 8 to 10, paragraphs 0048 to 0067) and Japanese Patent Laid-Open No. 2003-330638 (FIGS. 3 and 8 to 10, paragraphs 0039 to 0044), print settings can be reproduced by displaying a print history of past print operations on a host computer and prompting the user to select one of the print operations. According to a technique disclosed in Japanese Patent Laid-Open No. 2000-222159 (FIGS. 3 and 4, paragraphs 0039 to 0044), driver settings (print settings) frequently used can be reused by giving "favorite" settings to the UI of a printer driver. According to a technique disclosed in Japanese Patent Laid-Open No. 2003-91389 (FIGS. 20 and 21, paragraphs 0080 and 0081), settings are managed separately as common settings and device-dependent settings in order to implement "favorite" settings for a plurality of printers. A technique disclosed in Japanese Patent Laid-Open No. 2003-140854 (FIG. 2, claim 1) provides a print policy creation program which can arbitrarily create and edit print conditions by using, as print setting conditions, document conditions associated with a document and print attributes for giving an instruction to a printer. In Japanese Patent Laid-Open No. 2000-118095 (FIG. 8, paragraphs 0043 to 0046), a folder dedicated to store print data is prepared to implement a hot folder function of, when it is detected that print data has been stored in the folder, generating a print job at predetermined settings.

The above-mentioned documents disclose techniques to hold print data, print settings, and the like designated in printing on a computer, and to reproduce them in the form of a history, favorite, or hot folder.

With recent development of techniques such as Web services, a processing module (to be referred to as a driver filter hereinafter) in a printer driver can be technically updated in real time. Since a printer is also connected to a network, a processing module (to be referred to as a device filter hereinafter) in a printer can also be technically updated in real time. In the environment where the driver filter and device filter are updated in real time by Web services or the like, the computer does not always store the update status (e.g., the version of a currently installed device file) of the device filter of the printer. Information such as print settings designated in printing on a computer cannot provide information on a device filter which is actually used in the printer. No image output can be faithfully reproduced as a final print result.

The filter in the present invention means a program (software component) which is plugged in order to add any additional function, or perform any operation so as to select data before data is passed to the processing body of application software. The mechanism of the filter is similar to a technique called a hook, but is different from the hook because the hook always transfers all data having undergone any processing to a downstream software component without omitting any data.

SUMMARY OF THE INVENTION

The present invention has been made to solve the conventional problems, and has as its object to provide a printing system and document management system in which filter information on a filter module used to, e.g., convert print data is stored as filter history information, and the filter history information can be reused to reproduce a printed material output once in exactly the same format.

To solve the above problems, the document management system according to the present invention comprises the following arrangement. That is, a printing system comprises a conversion unit which performs conversion processing for print data by using a filter module specified by filter information attached to the print data, a history storage unit which stores filter information for specifying the filter module used by the conversion unit, and a filter re-designation unit which reads out the filter information stored by the history storage unit and attaches the filter information to the print data.

The conversion unit corresponds to a print data generation unit 42 in FIG. 2. The history storage unit corresponds to a BOX 55. The filter re-designation unit corresponds to a filter designation UI/filter re-designation UI 49.

A document management system capable of executing a print job for at least one printer comprises a driver filter information transmission unit which transmits, to a designated printer, driver filter information used by the print job in a printer driver when printing is executed, a filter information history storage unit which stores, in the printer, a filter information history including both the driver filter information transmitted by the driver filter information transmission unit and device filter information used by the print job in the printer, a filter information history obtaining unit which obtains the filter information history from the printer and stores the filter information history in the document management system, and a filter information history presentation unit which presents, to a user, the filter information history stored in the document management system, wherein when a print job is executed by designating the filter information history presentation unit, the print job is executed using a driver filter in the printer driver and a device filter in the printer in accordance with the held filter information history.

The filter information history presentation unit corresponds to a filter information history management/editing unit 41.

An information processing apparatus which passes print data to a printing apparatus and causes the printing apparatus to print comprises a conversion unit which performs conversion processing for print data by using a filter module specified by filter information attached to the print data, and a filter re-designation unit which attaches the filter information to the print data by reading out the stored filter information from a history storage unit that stores filter information for specifying the filter module used by the conversion unit.

In an information processing apparatus which causes a printing apparatus to print by passing print data to the printing apparatus having a conversion unit that performs conversion processing for print data by using a filter module specified by filter information attached to the print data, the filter information is attached to the print data by reading out the stored filter information from a history storage unit which stores filter information for specifying the filter module used by the conversion unit.

The present invention can execute filter processing stored as history information, and faithfully reproduce an image output as a final print result. The present invention can edit designated filter processing in accordance with user operation, and can also change some filter modules.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a conceptual view for explaining load sharing by proper use of filters in an example of 4in1;

FIG. 4 is a conceptual view for explaining load sharing by proper use of filters in an example of a confidential stamp;

FIGS. 5A to 5C are schematic views showing storage, obtainment, and reproduction of a filter;

DETAILED DESCRIPTION OF THE PREFERRED EMBODIMENTS

First Embodiment

Configuration of Printing System

Figure 1:
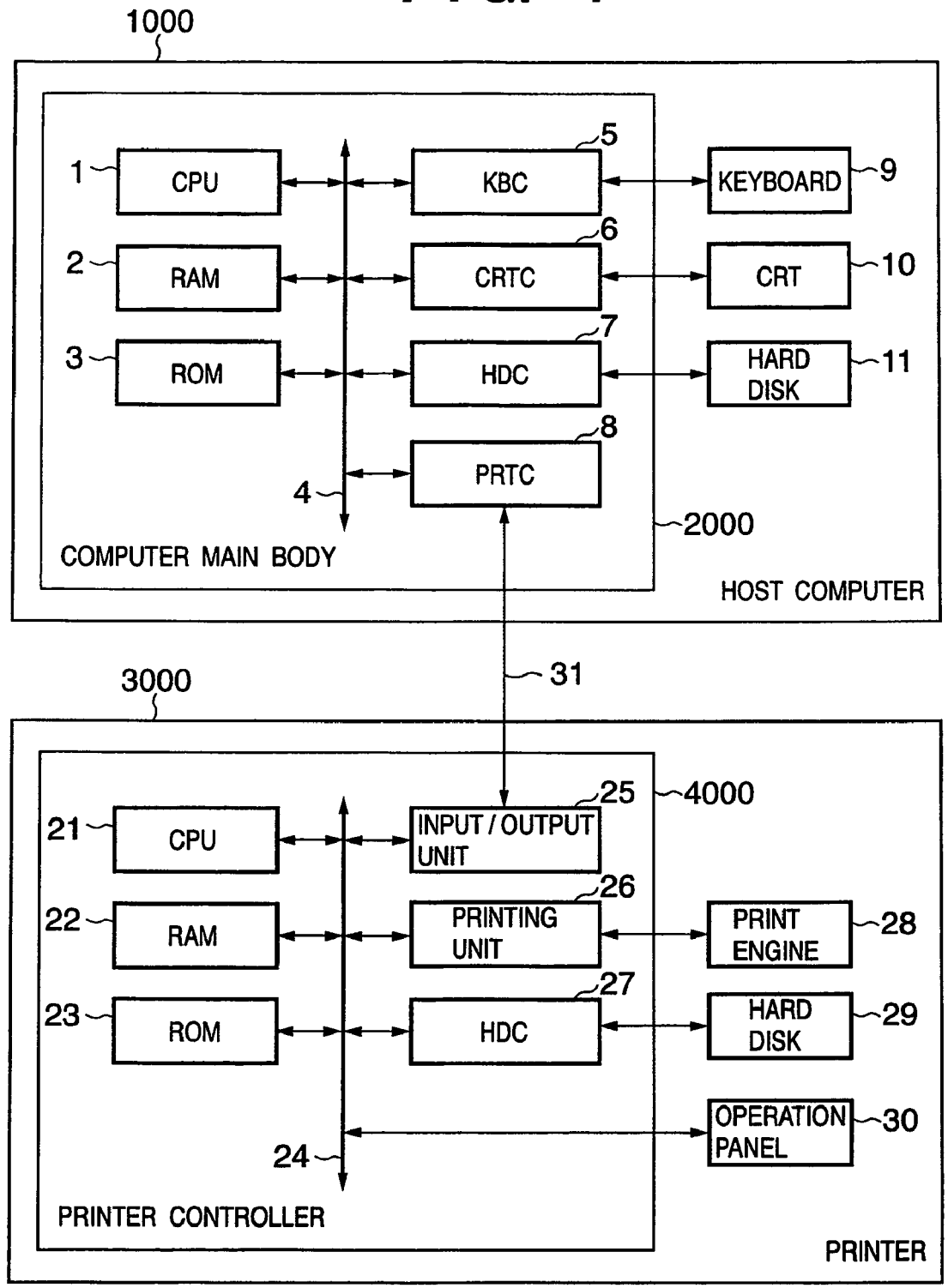
FIG. 1 is a block diagram showing the schematic configuration of a printing system used in a document management system according to the first embodiment of the present invention.

The first embodiment of the present invention will be described in detail below with reference to the accompanying drawings. FIG. 1 is a block diagram showing the schematic configuration of a printing system used in a document management system according to the first embodiment of the present invention. The printing system is built by connecting a host computer 1000 serving as a host apparatus and a printer 3000 serving as a printing apparatus via a bi-directional interface 31.

Note that the present invention can be applied to a single device, a system made up of a plurality of devices, or a system which performs print processing via a network as far as the functions of the document management system according to the present invention are executed.

In FIG. 1, in the host computer 1000, external devices such as a keyboard 9, CRT 10, and hard disk 11 are connected to a computer main body 2000. The computer main body 2000 comprises a CPU 1. The CPU 1 can execute calculation by expanding, in a RAM 2, control programs and applications which are archived in a ROM 3 and the hard disk 11. An input from the keyboard 9 serving as an external device is controlled by a keyboard controller (KBC) 5. Display on the CRT 10 is controlled by a CRT controller (CRTC) 6, and an input/output to/from the hard disk 11 is controlled by a hard disk controller (HDC) 7. A printer controller (PRTC) 8 is connected to the printer 3000 via the predetermined bi-directional interface 31, and controls communication with a printer controller 4000. The hard disk 11 stores, e.g., created document data, or print data which is generated by a printer driver program executed by the CPU 1 on the basis of document data. In the hard disk 11, folders each serving as a unit of files are prepared by a function provided by an operating system, and data files and program files are hierarchically managed in the folder. As a special folder, a hot folder is provided. The hot folder is monitored by executing a specific program. When a data file is input to the hot folder (for example, the user drags and drops a data file to the hot folder on the window of Windows® Explorer or the like, or the user selects a hot folder as a data file storage destination and stores a data file), predetermined processing is executed for the data file. In the first embodiment, the predetermined processing is to open a data file (open a file by an application associated with an input data file) and perform print processing at print settings associated with the hot folder. The CPU 1, RAM 2, ROM 3, KBC 5, CRTC 6, HDC 7, and PRTC 8 are connected to each other by a system bus 4, and these devices are comprehensively controlled by the CPU 1.

In the printer 3000, reference numeral 21 denotes a printer CPU which comprehensively controls access to various devices connected to a bus 24 on the basis of, e.g., a control program stored in the program ROM of a ROM 23, and outputs an image signal as print data to a print engine 28 connected via a printing unit 26. The CPU 21 can communicate with the host computer 1000 via an input/output unit 25, and notify the host computer 1000 of information in the printer 3000. A RAM 22 functions as a main memory, work area, and the like for the CPU 21, and the memory capacity of the RAM 22 can be expanded by an optional RAM connected to an expansion port (not shown). The RAM 22 is also used as a rendering memory, video signal information storage area, and the like for storing print data and image bitmap data which are received from the host computer 1000. A hard disk 29 controlled by a hard disk controller 27 is used to store print job data in a BOX and in addition, store a filter information history peculiar to the present invention. An operation panel 30 is a user interface when the user operates the printer 3000, and is made up of various switches, an LED display device, a touch panel type liquid crystal panel, and the like. When a filter module is upgraded, a filter module of an old version can also be stored.

Note that the printer 3000 may be a single-function printer or a multi-function printer having scanner, copying, and FAX functions as far as the printer 3000 can implement the functions of the present invention. The first embodiment assumes a print engine for a laser beam printer as the print engine 28. In practice, the functions of the present invention are not restricted by whether the print engine is of an inkjet type or another print type such as a thermal printer type.

Figure 2:
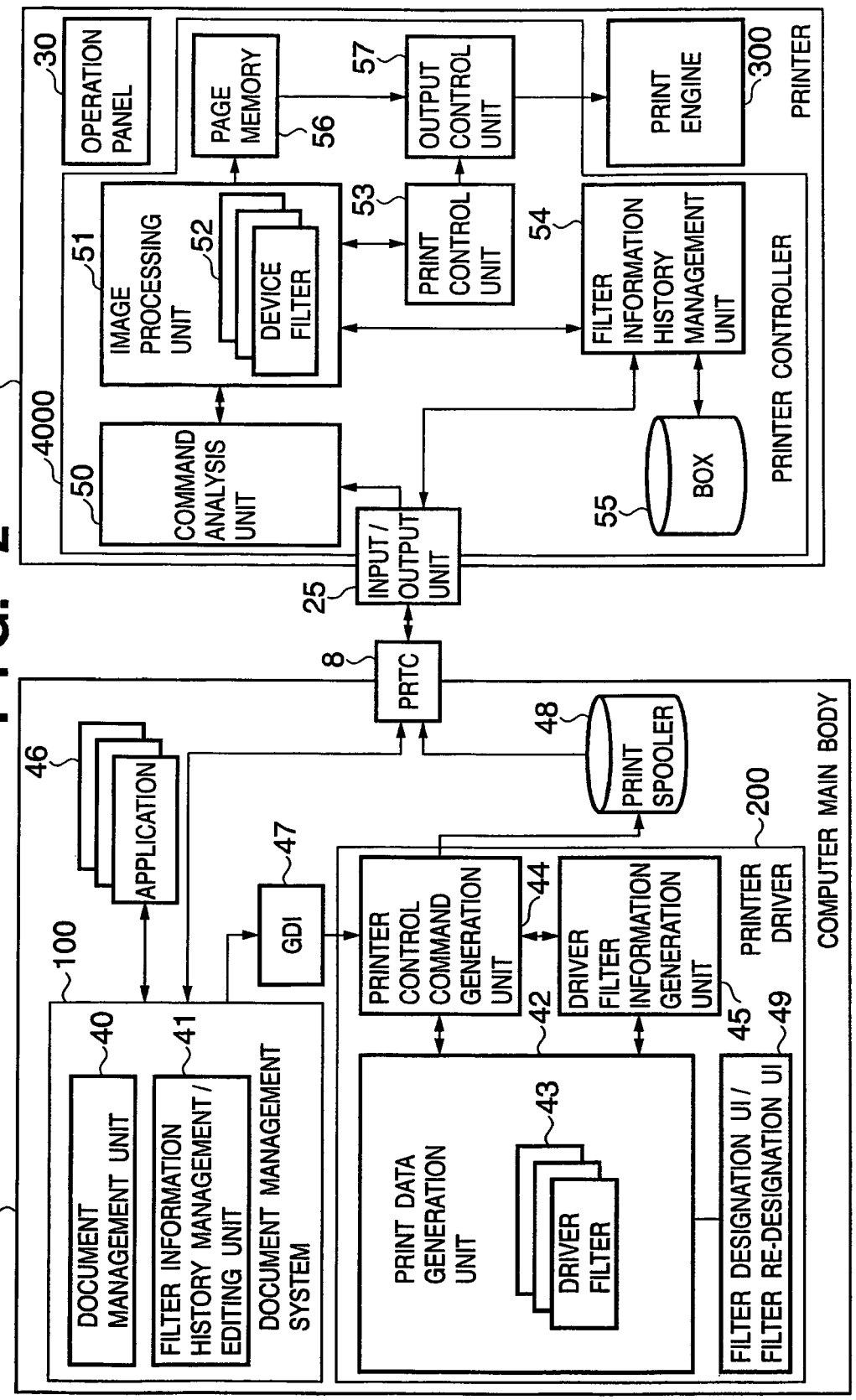
FIG. 2 is a functional block diagram for explaining a processing configuration concerning a print function in the printing system.

FIG. 2 is a functional block diagram for explaining processing configurations concerning the print function in the computer main body 2000 of the host computer 1000 and the printer controller 4000 of the printer 3000 shown in FIG. 1. The same reference numerals as those in FIG. 1 denote the same parts. In FIG. 2, the computer main body 2000 functions as, e.g., a server or client, and outputs print information made up of print data and a control code to the printer 3000. Each block in FIG. 2 is implemented by a software module (program) executed by the CPU 1 in the host computer 1000 or the CPU 21 in the printer 3000 except blocks common to those in FIG. 1.

The printer 3000 is roughly divided by function into the printer controller 4000, operation panel 30, and print engine 28. In the printer 3000, the printer controller 4000 is comprised of the input/output unit 25 functioning as a connecting portion with the computer main body 2000, a command analysis unit 50 which analyzes a command of received data, an image processing unit 51, a print control unit 53, a page memory 56, an output control unit 57, a filter information history management unit 54, a BOX 55, and the like.

Each unit will be briefly explained. Print data received by the printer 3000 via the input/output unit 25 is read out to the command analysis unit 50 or image processing unit 51 where the data is processed, as needed. The image processing unit 51 comprises various device filters 52 as modules which perform processing necessary for image processing. These device filters 52 are prepared by defining layout processing (e.g., Nin1), image processing (halftone processing), and additional processing (stamping) as modules in replaceable formats. Nin1 printing means a function of rearranging N pages created by a document processing system on one page of a sheet and printing these pages. The device filters 52 which are actually used in printing can be changed at any time in accordance with designation from the input/output unit 25 or operation panel 30. A filter module for use is designated by filter information attached to print data received from the host computer 1000. In the first embodiment, "reception" of data or the like includes a variety of operations for receiving data and the like. For example, when data or the like is written via a bus or loaded via the bus, or data is sent in response to an issued data request, these operations are simply referred to as "reception" in the first embodiment.

The image processing unit 51 sequentially rasterizes objects such as a text and image in the page memory 56 by using the device filters 52 and the like. The image processing unit also decompresses compressed image data. The page memory 56 may be managed by parallel processing, i.e., banding control of rasterization processing and output of a video signal to the print engine 28. Alternatively, when a sufficient memory capacity remains, the page memory 56 may ensure an area capable of rasterizing one page.

The output control unit 57 converts the contents of the page memory 56 into a video signal, and transfers the video signal to the print engine 28. Transfer processing is controlled by the print control unit 53 in synchronism with the image processing unit. The print engine 28 is a mechanism of holding a received video signal as a permanent signal and forming the video signal as an image on a print sheet.

The filter information history management unit 54 peculiar to the present invention manages, in the BOX 55, filter information of driver filters 43 (details of which will be described later) and the device filters 52 that are used by past print jobs. A filter module itself specified by filter information is stored as a program file in the BOX 55 in a format with which the filter module can be specified by its name, version, or the like. The BOX 55 is an area ensured in the internal hard disk of the printer 3000. Information in the BOX 55 can be referred to by designating it by the user externally via the input/output unit 25 or from the operation panel.

The configuration of the computer main body 1000 will be explained. The keyboard 9 serving as an input device and the CRT 10 serving as a display device are connected to the computer main body 1000, implementing one computer system. Assume that the computer main body 1000 runs under a basic OS such as Windows®, UNIX®, or MacOS®.

In the computer main body, a document management system 100 according to the present invention operates. The document management system 100 comprises a filter information history management/editing unit 41 unique to the present invention, in addition to an original document management unit. When attention is given to only functions, the remaining building components are classified into an application 46 which creates a document managed by the document management system 100, a graphic device interface (to be referred to as a GDI hereinafter) 47 serving as part of a basic OS, a printer driver 200, and a print spooler 48 which temporarily stores data generated by the printer driver 200.

Note that the names and functional frameworks of these components slightly change depending on the basic OS, but the names and functional frameworks are not essential to the present invention as far as modules can implement technical functions in the present invention. Module names such as a GDI or printer driver are unique to Windows® OS, and equivalent functions in another basic OS are implemented by modules called a graphic kernel and the like. The print spooler 48 can also be implemented by assembling processing into a module called a print queue. The computer main body 1000 having these building components is generally controlled by software (BIOS) called basic software under hardware such as the CPU 1, RAM 2, ROM 3, and hard disk 11 shown in FIG. 1, and application software runs under the basic software. The printer driver 200 is also regarded as one of application software programs. The application 46 means application software (e.g., word processing software or spreadsheet software) which runs on the basic software. Further, a plurality of applications 46 can start at arbitrary timings (the applications 46 vary mainly depending on the memory capacity).

General printing will be explained by exemplifying a case wherein arbitrary image editing software is used as the application 46. The application 46 mainly performs image editing work in accordance with user operation. To print a generated image, the user selects a print menu displayed on the CRT 10 with a mouse or the like, and executes printing. In the first embodiment, data generated by the application 46 is called document data or a document data file regardless of the contents of the data.

The application 46 calls the GDI 47 serving as one function of the basic software. The GDI 47 is a basic function group which controls a display device and printing device for window display, printout, and the like. By using the basic function group of the GDI, various applications available from various manufacturers can operate the application 46 without any consciousness of a model (hardware)-dependent part. Note that an operation of passing document data from an application by using the basic function of the GDI and instructing the basic software to print is sometimes called "to instruct or command the basic software by the application to print".

The GDI 47 receives information such as the rendering performance or print resolution of a printing device (in this case, the printer 3000) from the printer driver 200 which manages information depending on the model of each printing apparatus. The GDI 47 processes an API (Application Program Interface) function called by the application 46. In accordance with the processing contents, the printer driver calls a function to be provided to the GDI 47. This function is a predetermined interface (Device Drive Interface: commonly called DDI). The creator of the printer driver program creates a printer driver mainly for data conversion to output data from the interface to an actual printing apparatus.

The printer driver 200 is equipped with a filter setting UI/filter resetting UI 49 which allows the user to make print settings. The user can make print settings via this UI. When a filter stored as a history is used, the user can designate again the stored filter. Print settings including designation of a filter are called print environment settings. The printer driver 200 performs processing by a print data generation unit 42 and printer control command generation unit 44 on the basis of DDI information received from the GDI 47 and print environment settings made via the graphical user interface (GUI) of the printer driver 200 (i.e., print environment setting parameters input by the user). The printer driver 200 sends generated data and commands to the print spooler 48. Data generated by the printer driver will be called print data. These data and commands are sent from the print spooler 48 to the printer 3000 via the PRTC 8.

In the first embodiment, the print data generation unit 42 holds the driver filters 43 used when processes such as layout processing (e.g., Nin1) and image processing (e.g., stamping or halftone processing), which have been described above with reference to the image processing unit 51 in the printer 3000, are executed in the printer driver 200. The driver filters 43 are used in accordance with designation. More specifically, print data undergoes necessary processing by the driver filters 43 and processing by the device filters 52 in the printer 3000 to generate a final output image. By properly using the driver filters and device filters, a load-sharing printing system which considers the performance of the computer main body 2000 and that of the printer 3000 can be implemented.

Load sharing by proper use of the filters will be explained in more detail with reference to FIGS. 3 and 4. As filter types, FIG. 3 exemplifies a 4in1 layout, and FIG. 4 exemplifies a confidential stamp.

The document management system in FIG. 3 requests printing of 4-page data in the 4in1 layout, as represented by 401. The upper stage illustrates a processing sequence 301 of executing actual 4in1 by a driver filter 402. Print data having undergone 4in1 processing and information "Done 4in1" representing that 4in1 has ended are written in a spool file 403. The spool file 403 is transmitted to the printer controller 4000 via a path 31 which connects the host computer 1000 and printer 3000. Since 4in1 has already been done, the printer controller 4000 outputs an output result 405. The printer driver generates print data on the basis of document data received from an application via the GDI, and the print data is described by PDL. The PDL describes the position and size of an object and the like in each page. Thus, when the driver filter performs 4in1 processing, data of four pages which are generated by the application are mapped in one page, and the positions and sizes of the four pages are described in the generated/spooled 1-page print data.

The lower stage illustrates a system 302 which does not perform 4in1 by the driver filter 402. Information "Do 4in1" which instructs a device to execute 4in1 is written in a spool file 407. Similar to the above example, the spool file is transmitted via the path 31, and undergoes 4in1 processing by a device filter 404 to output an output result 408. When PDL is exemplified, print data which is generated and spooled by the printer driver contains data obtained by describing, by PDL, four pages generated by an application, and parameters necessary to lay out the four pages on one page. The 4-page data are reduced and rearranged by the device filter to create and output, e.g., 4in1 bitmap data.

Since the driver filter 402 and device filter 404 perform almost the same processing, the load can be shared between the host computer 1000 and the printer 3000 by determining which of the driver filter 402 and device filter 404 performs processing.

FIG. 4 shows a flow similar to that of FIG. 3. FIG. 4 exemplifies a confidential stamp instead of the 4in1 layout. As for stamping, the same load sharing is achieved. In FIG. 4, document data subjected to stamping and a stamp image are simultaneously transmitted as a spool file in a lower stage 412. In practice, a stamp image may be stored in the BOX 55 of the printer 3000. In this case, by using the device filter, no stamp image need be passed from the computer to the printer.

The filter is a software module which executes processing such as layout or stamping, as shown in FIGS. 3 and 4. The filter serving as a software module is highly expandable and highly flexible. A filter having a function other than those shown in FIGS. 3 and 4 can also be installed in the printer driver or printer. In this case, the installed filter can be designated again to execute printing.

In the printing system as shown in FIG. 2, load sharing and customization can be facilitated by selecting necessary filters from the driver filters 43 used in the computer main body 2000 and the device filters 52 used in the image processing unit 51 of the printer controller 4000, and properly using the selected filters. The filters can be managed by the document management system 100 serving as a host application. When attention is given to a set of print data, how to distribute processing is determined by filter instruction information attached to document data or print data. The filter instruction information contains the name or version of a filter module for use. When the user explicitly designates filter instruction information, the document management system 100 complies with it. When no filter is explicitly designated, the document management system 100 properly determines filters, creates filter instruction information, and attaches it to print data.

Figure 5C:
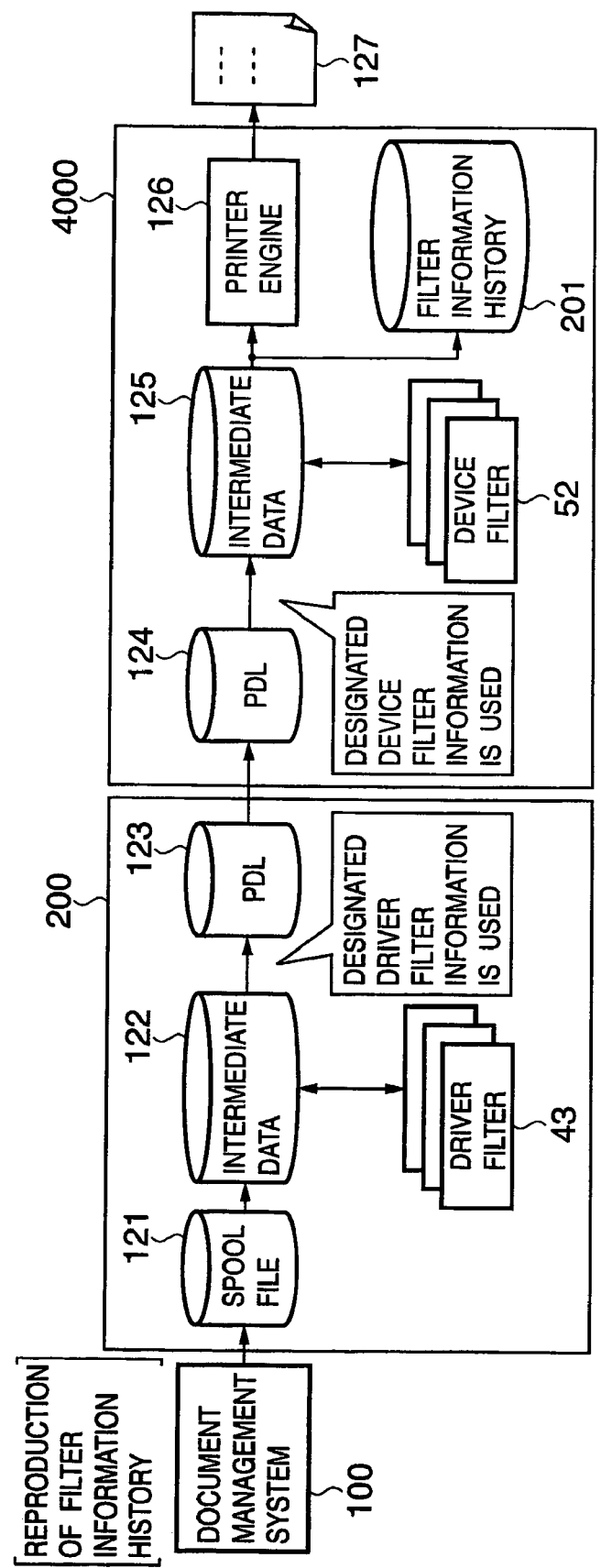

Storage, obtainment, and reproduction of filter information, which are features of the present invention, will be briefly explained with reference to schematic views. FIGS. 5A to 5C are schematic views showing these features. A data flow for [storage of filter information] in FIG. 5A will be explained. Pieces of filter information for specifying a driver filter and device filter which are used to process print data are stored when the document management system 100 designates storage of filter information. In the printer driver, a spool file 101 is converted into intermediate data 102. The intermediate data 102 is processed by the driver filter 43 as described above. Filter information (e.g., the name and version of a filter module, and if necessary, a parameter and the like) on a filter module used is stored, embedded in a PDL 103, and transmitted to the printer. Upon reception of the print data, the printer controller 4000 similarly converts the print data into intermediate data, which is processed by the device filter 52. A final output image is sent to a printer engine 106, and output onto a paper sheet 107. At the same time, driver filter information which is embedded in the print data and associated with the driver filter 43 used in the printer driver 200, and device filter information associated with the device filter 52 used in the printer controller 4000 are stored as a filter information history 201 in the BOX 55 managed by the filter information history management unit 54.

FIG. 5B is a view showing a data flow when the document management system 100 obtains the filter information history 201 of the printer controller 4000. The document management system 100 issues a filter information obtaining command different from a print job to the printer 3000, and obtains the filter information history 201 in the BOX 55 from the filter information history management unit 54 in response to the filter information obtaining command. The obtained filter information history 201 is managed in association with a hot folder in the host computer 1000. The hot folder is managed by the document management system 100.

FIG. 5C is a view showing a data flow when the document management system 100 which has obtained the filter information history 201 prints using a filter designated again by a user instruction, i.e., a filter contained in a filter information history. FIG. 5C shows a flow when the user executes printing for a hot folder created in association with filter information obtained by "obtainment of a filter information history" in FIG. 5B. In printing from the document management system 100, filter information on both the driver filter 43 and device filter 52 for use is transmitted together with print data. Upon reception of the filter information, the printer driver 200 uses the designated driver filter 43. As information for specifying a filter module, the filter information contains information capable of specifying whether the filter is a driver filter or device filter. The printer controller 4000 also outputs data using the designated device filter 52. These operations are executed by the document management system 100, printer driver 200, and printer controller 4000 in cooperation with each other, reproducing faithful printing.

Storage and Reproduction of Filter Information

The operations of the document management system 100, printer driver 200, and printer controller 4000 will be described with reference to the drawings.

Document Management System

Figure 6A:
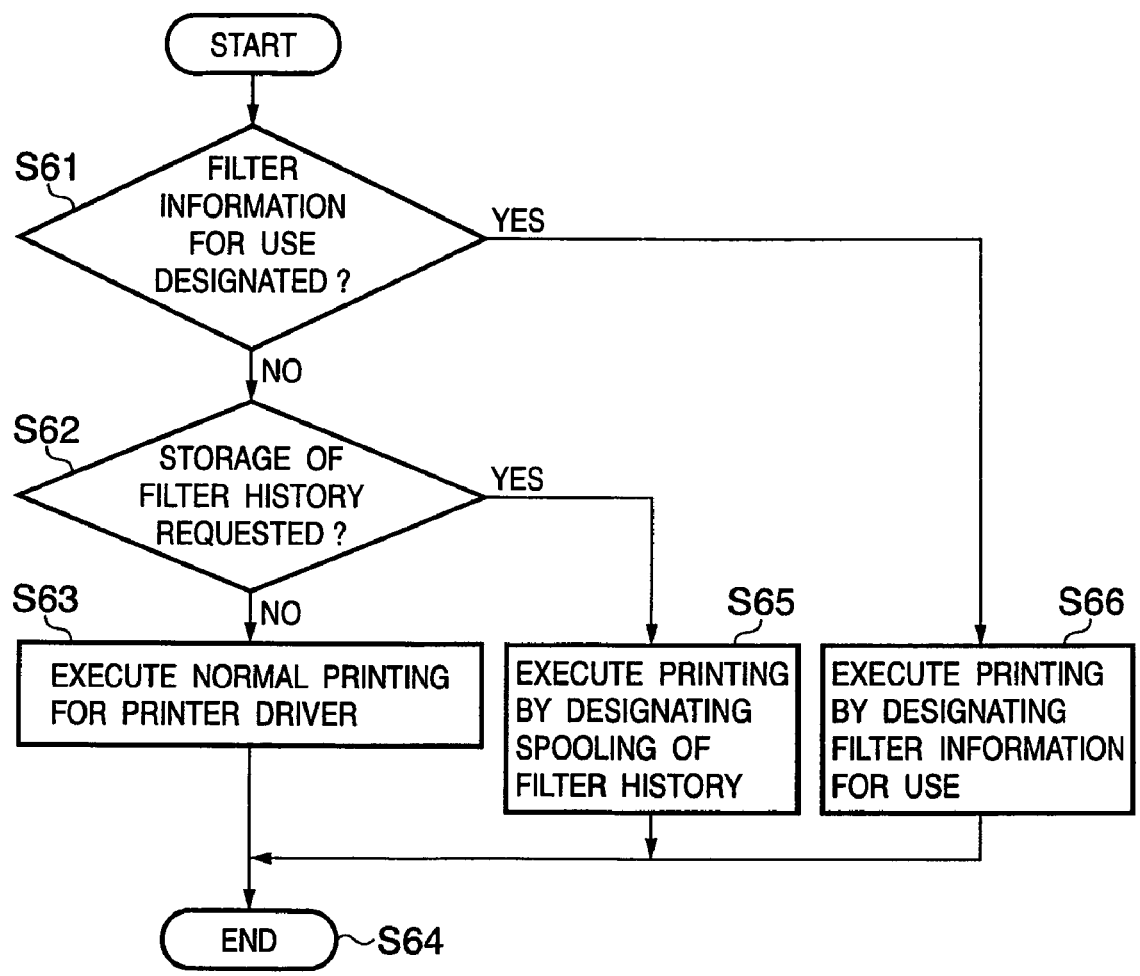
FIGS. 6A and 6B are flowcharts showing a feature of the present invention concerning the operation of the document management system in printing.
Figure 6B:
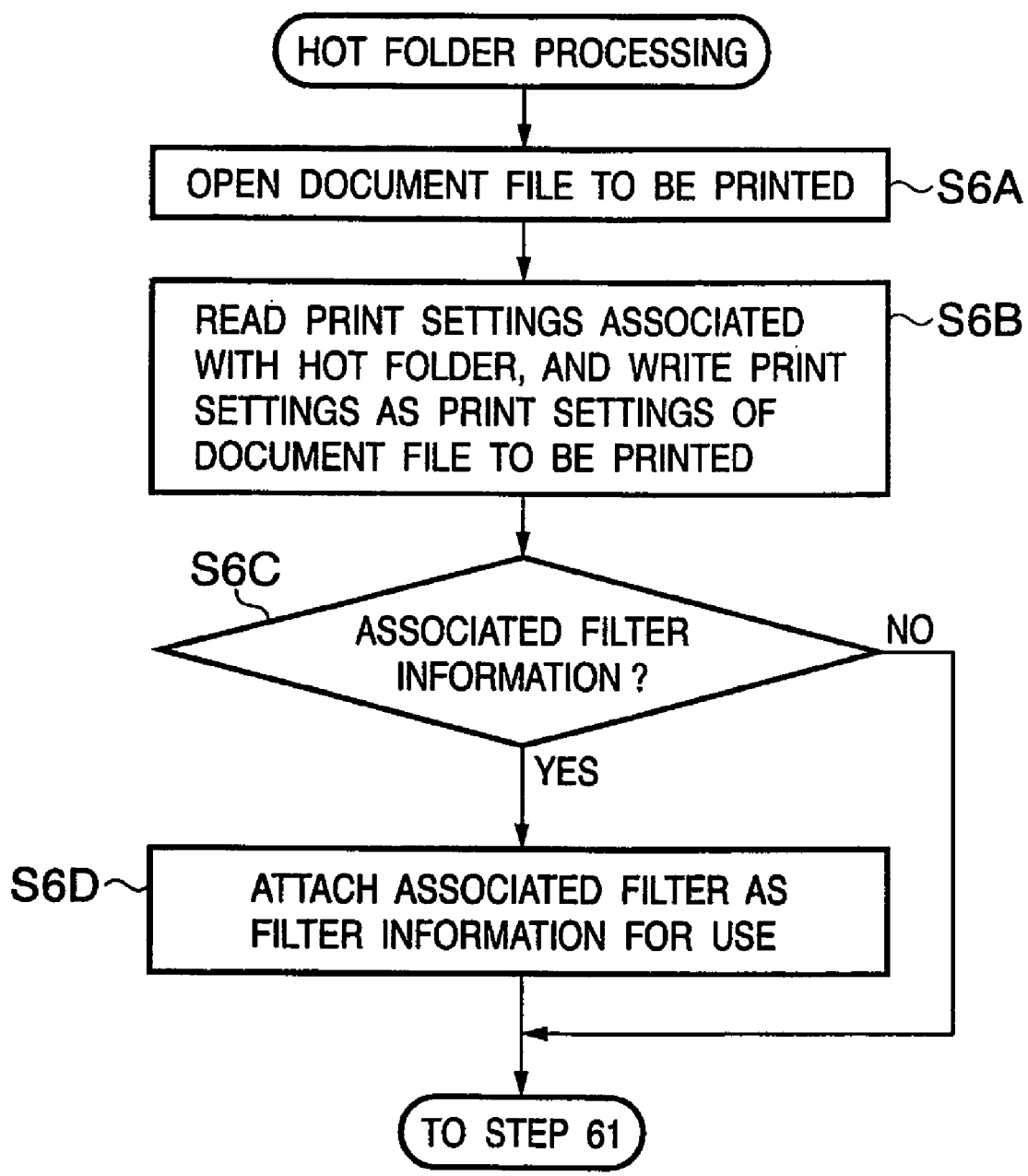

FIGS. 6A and 6B are flowcharts showing the operation of the document management system (program) 100. FIG. 6B shows a processing sequence by the document management system 100 up to printing of document data input to the hot folder. The document management system 100 periodically monitors the hot folder. When document data is input to the hot folder, i.e., stored, the document management system 100 opens the document file by using an application which has created the document file (step 6A). The document management system 100 reads print setting information associated with the hot folder, and stores it as the print settings of document data to be printed (step 6B). The document management system 100 determines whether filter information associated with the hot folder exists (step 6C). If associated filter information exists, the document management system 100 identifiably stores the filter information as filter information which specifies a filter used for print processing of the document data (step 6D). After that, the flow branches to FIG. 6A. Note that the filter information contains not only information for specifying a filter module, but also information representing the order of filter processing. This is because, when both the filter processes in FIGS. 3 and 4 are performed, the output result changes depending on the application order. If the processing in FIG. 3 is executed first, a confidential stamp is composited at the center of one page having the 4in1 layout. If the processing in FIG. 4 is executed first, four pages on each of which a confidential stamp is composited at the center are converted into 4in1.

To print document data stored in the hot folder, processing in FIG. 6A is executed subsequently to processing in FIG. 6B. Processing in FIG. 6A may also be executed for print processing using no hot folder.

In FIG. 6A, the document management system 100 determines whether filter information for use in printing is explicitly designated, i.e., filter information identifiably stored in step (6D) of FIG. 6B exists (step 61). If filter information for use is explicitly designated, the document management system 100 designates the filter information as filter information for specifying a filter module for use, and executes printing (step 66). This designation can be implemented by, e.g., passing filter information to the printer driver via the operating system. For example, document data to be printed is passed to the printer driver via the operating system together with information which specifies designated filter information.

If the document management system 100 is not instructed on any filter information, it determines whether storage of the filter history is requested (step 62). The document management system 100 may prompt the user to determine whether to request storage of the filter history in printing. Alternatively, the document management system 100 may hold, as a system setting, whether or not to always store the history. When storage of the history is requested by user designation or the system setting, the document management system 100 designates spooling of filter information on a filter module used, and executes printing (step 65). For this purpose, the document management system 100 passes, to the printer driver together with document data, a special command (filter history collection command) for collecting a filter information history.

If collection of the filter information history is not requested, the document management system 100 executes normal printing for the printer driver (63). In this case, the document management system 100 may properly determine filter information and pass it to the printer driver. In this case, the following processing is executed. The document management system has a list of device filter modules which can be used by the printer and driver filter modules which can be used by the driver. The list information suffices to be stored at the same time as, e.g., installing the printer driver. In order to implement designated print settings, filters for use are determined from available filter modules. If a filter module which provides the driver and device with the same results (e.g., those shown in FIG. 3 or 4) can be utilized among the filters determined to be used, filter processing is subjected to load sharing between the host computer and the printer. Load sharing is done by indexing the processing performance of the computer, that of the printer, and the load of filter processing. The first embodiment is not related to how to share the load. If a device filter module and driver filter module for use are determined as a result of load sharing, the document management system 100 passes filter information for specifying these modules, to the printer driver together with document data to be printed.

Printer Driver

Figure 7:
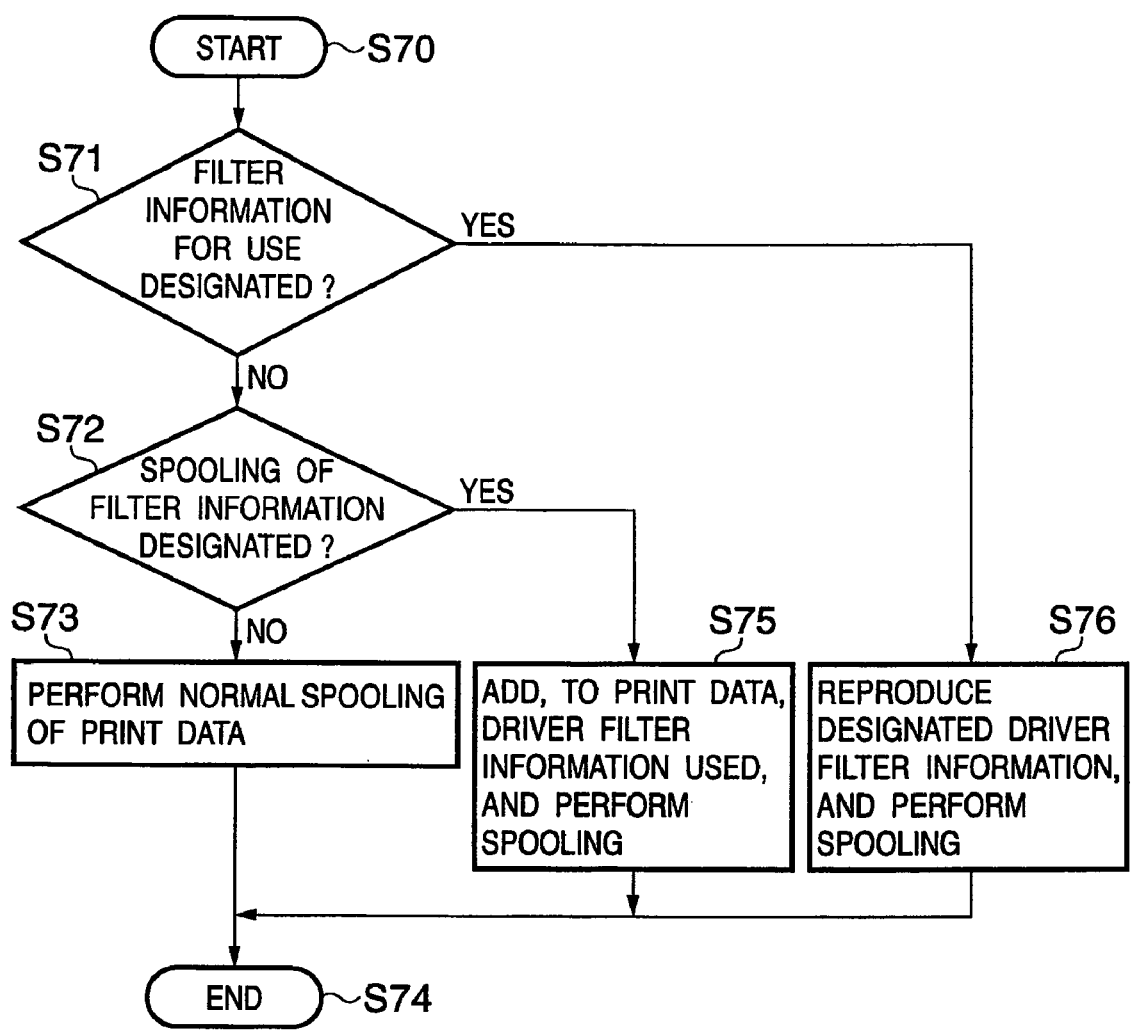
FIG. 7 is a flowchart showing a feature of the present invention concerning the operation of a printer driver in printing.

FIG. 7 is a flowchart showing the operation of the printer driver 200. In print processing, the printer driver 200 confirms whether it is instructed by the document management system 100 on filter information for use, i.e., it has received filter information on document data to be printed (step 71). When the document management system 100 always passes filter information to the printer driver 200, as described above, this determination result is always "YES". If the printer driver 200 is instructed on the filter information, it performs filter processing using a designated driver filter module in the managed driver filter information 43. The printer driver 200 transmits generated print data to the printer 3000 (step 76). The processing is done in an order corresponding to designation of the order of filter processing.

If the printer driver 200 is not instructed on any filter information, it determines whether it is instructed to spool filter information, i.e., a currently processed command is a filter history collection command (step 72). If the command is a filter history collection command, i.e., the printer driver 200 is instructed to spool filter information, it adds, to print data, driver filter information for specifying a device filter used, and spools the driver filter information (step 75). If the printer driver 200 has not been instructed to spool filter information, it executes normal processing, and spools print data without attaching any filter information (step 73). A program called a despooler is executed to transmit the spooled print data as a print job to the printer 3000.

When a filter module is used in accordance with print settings, the load of filter processing can also be shared by the printer driver. In this case, the above-described load sharing processing is executed in step 73, and determined filter information is attached to print data.

Printer Controller

Figure 8:
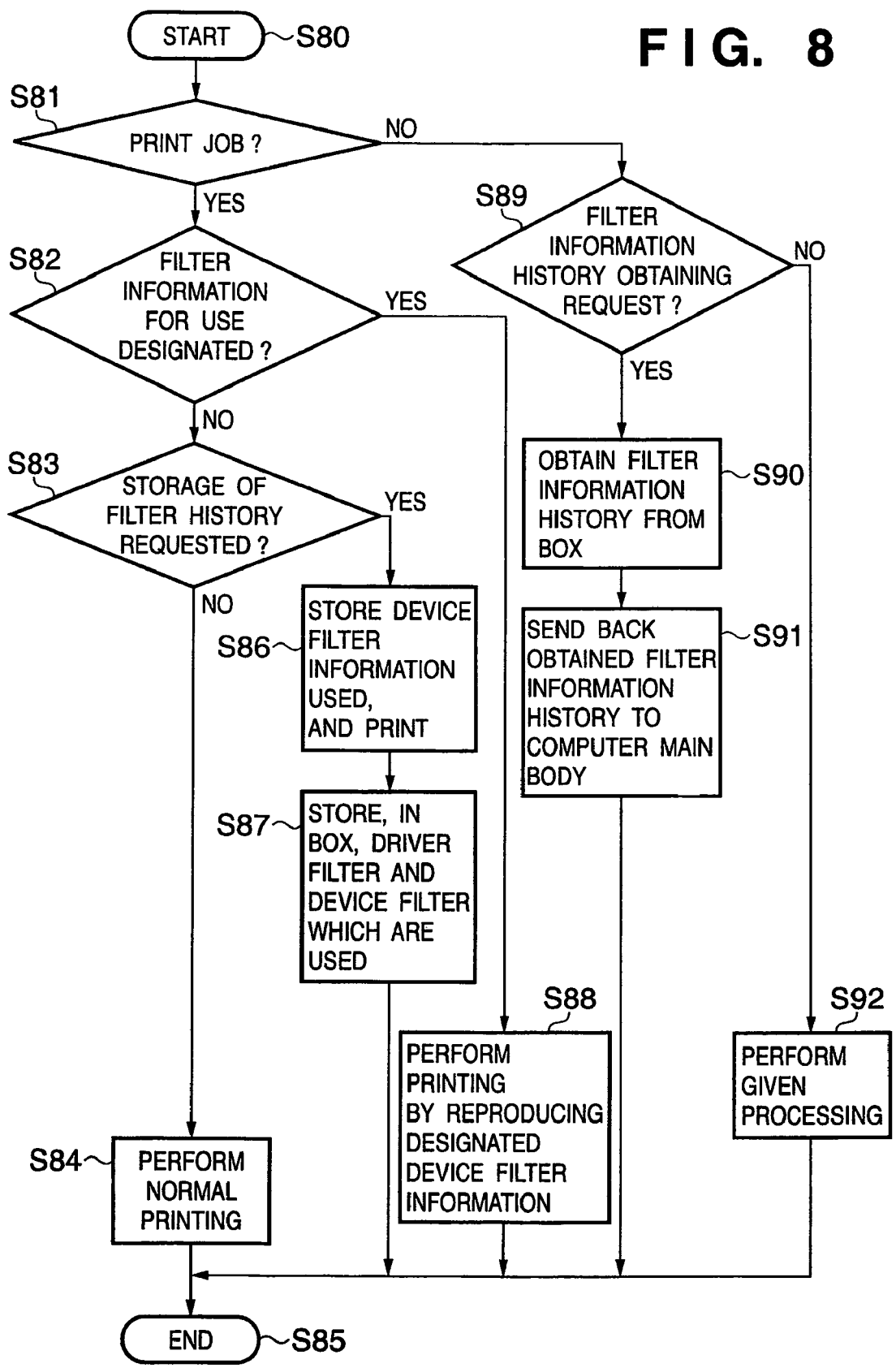
FIG. 8 is a flowchart showing a feature of the present invention concerning the operation of a printer controller in printing.

FIG. 8 is a flowchart showing the operation of the printer controller 4000. The printer controller 4000 determines whether transmitted information is a print job (step 81). If the transmitted information is not a print job, the printer controller 4000 determines whether the transmitted information is a filter information history obtaining request (step 89). The filter information history obtaining request is issued from, e.g., the document management system 100, but is not a print request and may reach the printer 3000 via a path different from that for a print command. Even through the same path as that for a print command, the filter information history obtaining request passes through the printer driver and the like without any processing. Regardless of the path, the filter information history obtaining request reaches the printer 3000.

If it is determined in step 89 that the transmitted information is not an obtaining request, the printer controller 4000 performs processing corresponding to the received request (step 92). If the transmitted information is an obtaining request, the printer controller 4000 obtains a filter information history from the BOX 55 (step 90), and sends back the obtained filter information history to the computer main body (step 91). If it is determined in step 81 that the transmitted information is a print job, the printer controller 4000 determines whether it is instructed on filter information for use (step 82). If the printer controller 4000 is instructed on filter information for use (i.e., device filter information is embedded in print data), it prints so as to reproduce filter information on the basis of the designated filter information (step 88). More specifically, the printer controller 4000 executes filter processing using a filter module which is specified on the basis of the filter information. The printer controller 4000 executes print processing on the basis of obtained bitmap data. If the version of the filter module specified by the filter information is older than a currently available version, the printer controller 4000 transmits the filter information to a server apparatus (not shown), and receives a corresponding filter module. The printer controller 4000 installs the received filter module in it so that the filter module can be executed. The printer controller 4000 executes filter processing using the filter module. After the end of the processing, the printer controller 4000 restores the replaced filter module of the new version to an available state. For this purpose, the filter module of the new version may be saved, or downloaded from the above-mentioned server apparatus and installed in the printer controller.

If it is determined in step 82 that the printer controller 4000 is not instructed on any filter information for use, the printer controller 4000 confirms whether it is requested to store a filter information history (step 83). If the printer controller 4000 is requested to store a filter information history, it prints while storing device filter information for specifying a device filter used (step 86). The reason of printing while storing device filter information is to, every time a parameter necessary to reproduce filter processing is detected, store the parameter as part of filter information. Further, the printer controller 4000 stores, as a filter information history in the BOX 55, filter information for specifying a driver filter and device filter used. Even when no filter is used, information representing that no filter has been used is stored. The format of the filter information history will be described with reference to FIG. 9. If the printer controller 4000 is not requested in step 83 to store a filter information history, the flow branches to normal printing, and the printer controller 4000 performs normal printing without storing any history (step 84).

Figure 9:
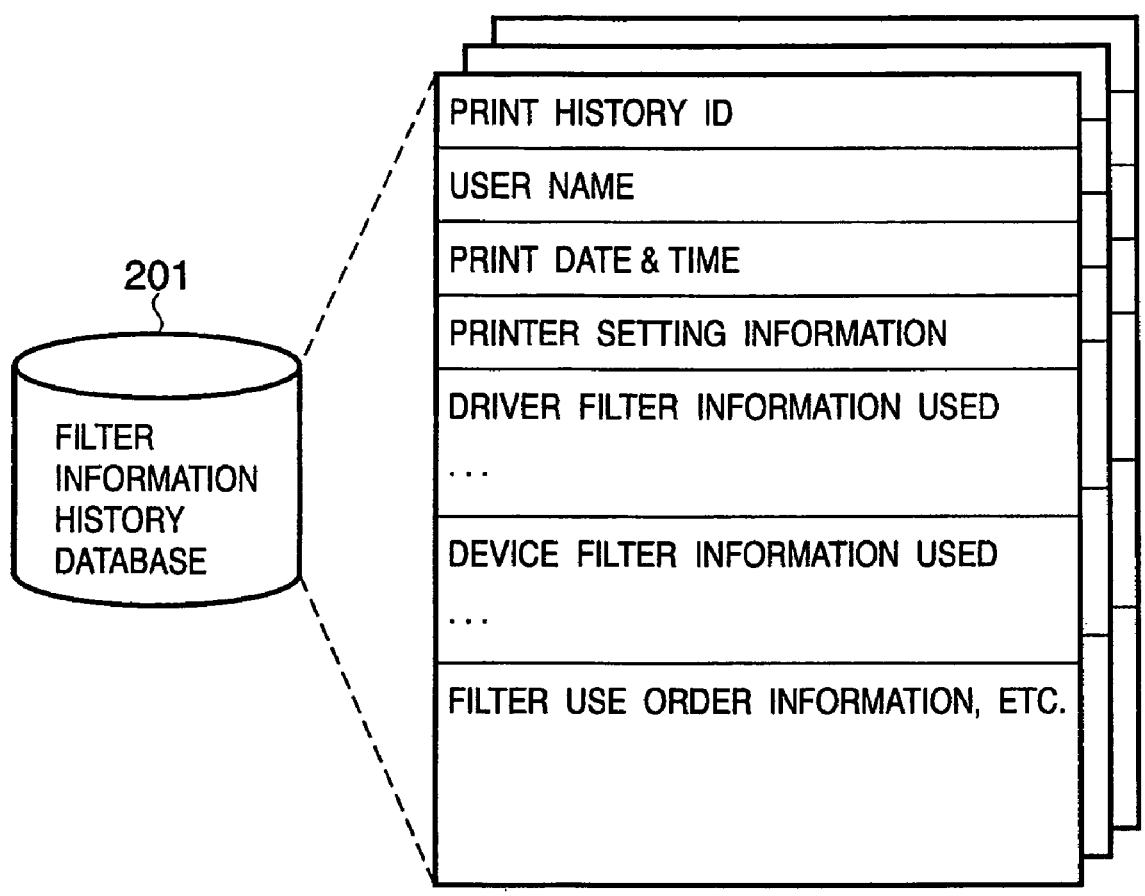
FIG. 9 is a view showing the contents of a filter information history database managed by a filter information history management unit in a printer.

FIG. 9 shows the filter information history 201. The filter information history 201 is managed in the BOX 55 by the filter information history management unit 54. The filter information history 201 is made up of a print history ID serving as an identifier, a user name for specifying a user who has performed printing, a print date and time, printer setting information, device filter information used, device filter information used, filter use order information, and the like. Pieces of information necessary for an obtaining request from the document management system are selected and provided. For example, a filter information history having the same user name as that of a user who has issued an obtaining request, or if a date and time are designated in the obtaining request, a filter information history corresponding to the date and time is sent back to the host computer. Upon reception of the filter history information, the document management system 100 of the host computer stores the filter history information in association with the hot folder. The printer controller may delete a filter information history obtained by the document management system 100 or keep storing it. In the latter case, the filter information history is deleted from the BOX 55 upon the lapse of a predetermined time or by using an explicit delete command from the document management system 100 as a trigger.

Figure 11:
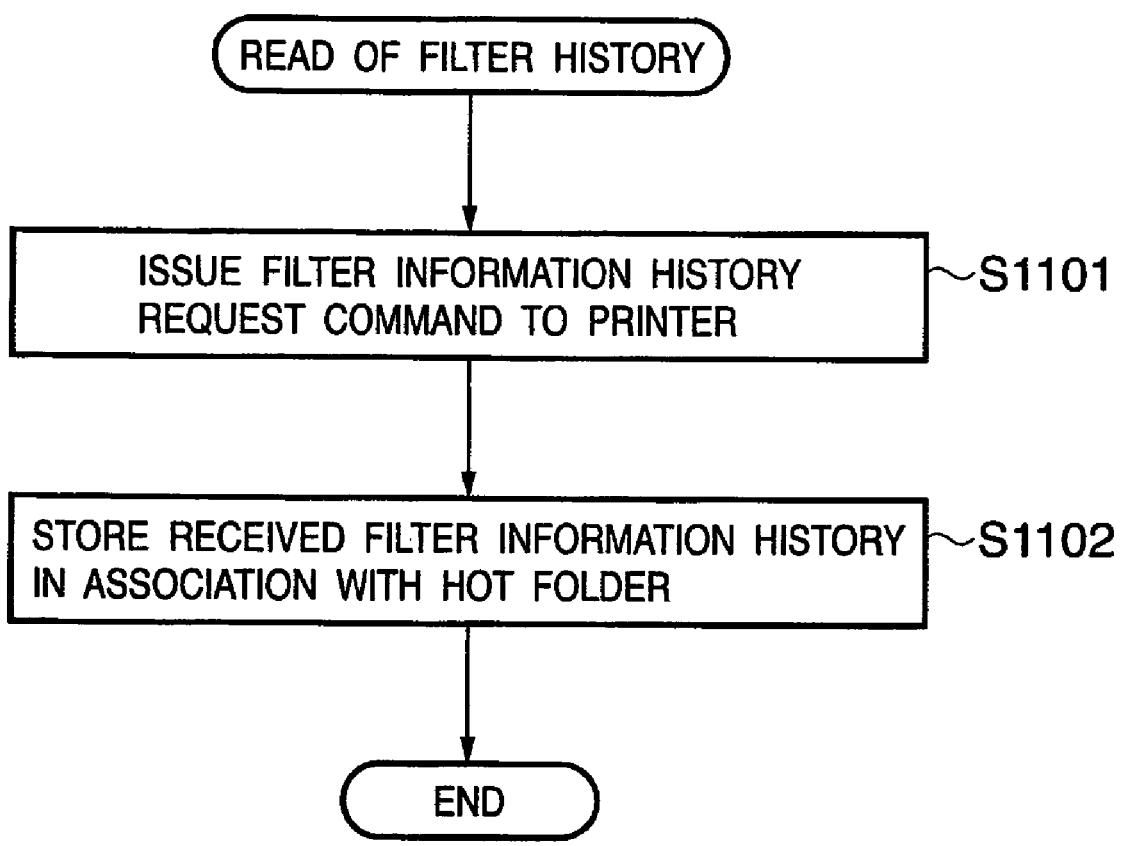
FIG. 11 is a flowchart showing a sequence of obtaining a filter information history in the document management system.

FIG. 11 shows a sequence by the document management system 100 when a filter information history is obtained. The document management system 100 issues a filter information history obtaining request to the printer controller 4000 (step 1101). The document management system 100 receives a response to this request from the printer controller 4000, and stores filter information contained in the received filter information history in association with the hot folder (step 1102). As a result, association between the hot folder and print settings including specifying of a filter module for use is completed.

Editing of Print Settings

Figure 10A:
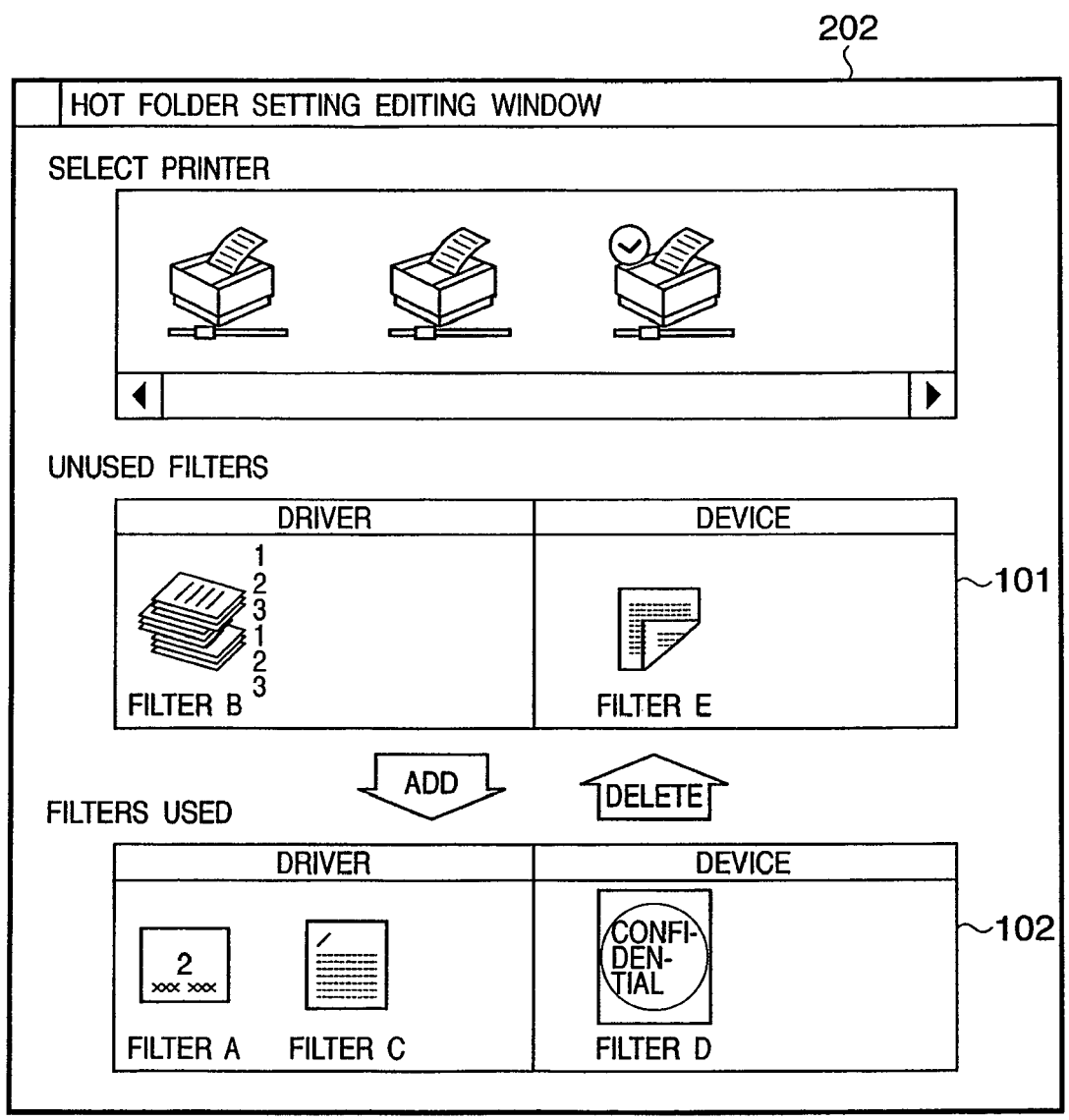
FIGS. 10A and 10B are views showing a hot folder setting editing window in the document management system.
Figure 10B:
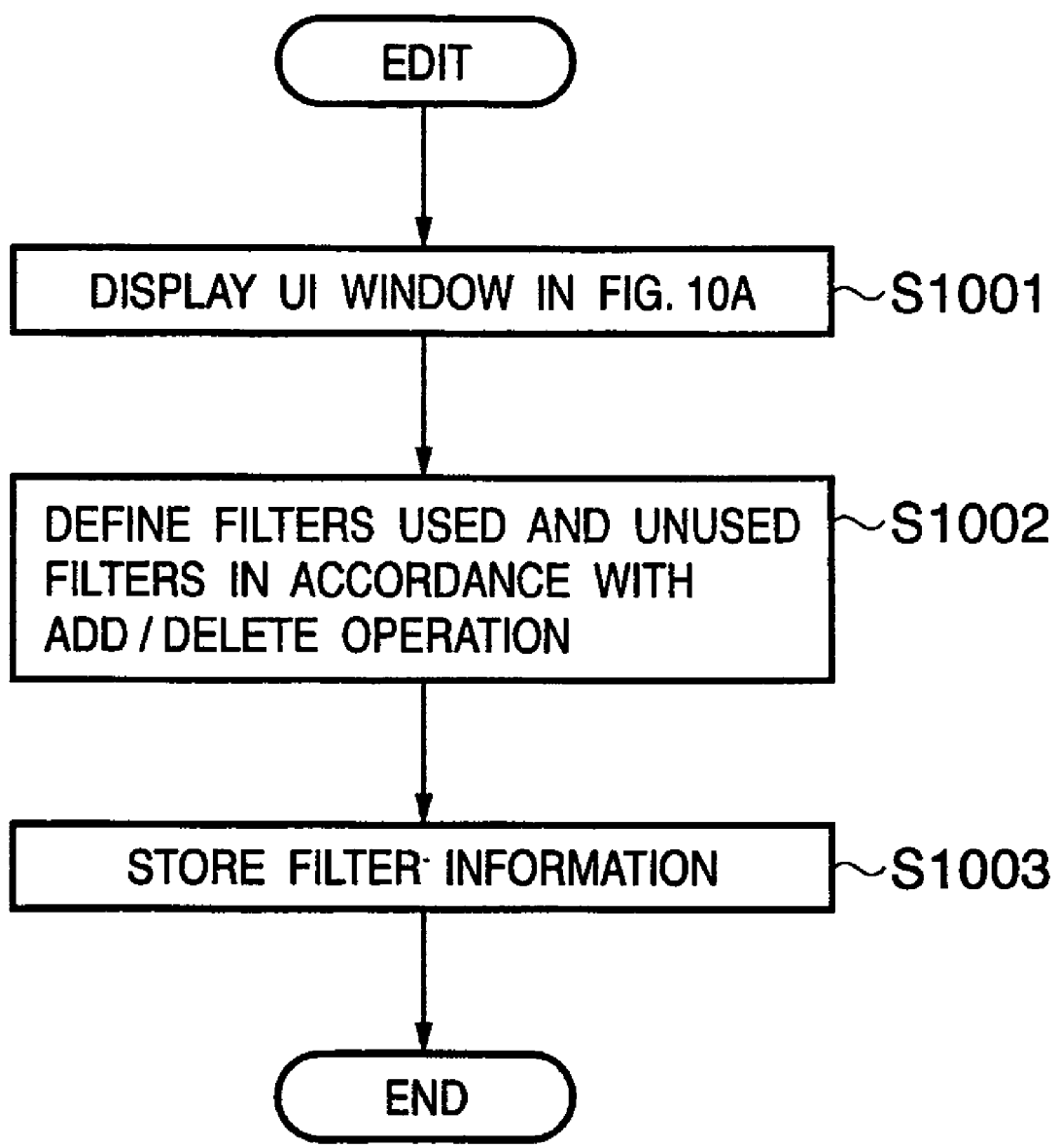

FIG. 10A simply illustrates a dialog capable of setting a hot folder in the document management system 100. In particular, editing of filter information will be explained. The document management system 100 manages a filter information history by the filter information history management/editing unit 41. At the same time, the document management system 100 manages a pair of the driver filter 43 and device filter 52 which can be used by the printer driver 200 and printer 3000, which has been described above. Various available driver filters and device filters are displayed as icons on a user interface. A combination of filters (filters used) which are available and used, and filters (unused filters) which are available but are not used is changed in accordance with icon operation on the user interface. A target printer can also be changed to another one, and presentation of available filters corresponding to a printer and conflicts with user settings are also managed.

For example, when the operator opens the user interface in FIG. 10A, filters used and unused filters at that time are displayed as icons in windows 101 and 102, as shown in FIG. 10A. The operator selects these icons and clicks an "add" or "delete" button, or performs drag & drop. Then, information representing "used" or "unused" is recorded in each filter information in correspondence with each icon. In step 6C of FIG. 6B, the presence/absence of associated filter information is determined for filter information for which information representing "used" is recorded.

By the above configuration and processing sequence, the printing system according to the first embodiment stores, as a filter information history, filter information which specifies a filter used in accordance with print settings. When printing using the settings is requested, a filter for use is specified, and filter processing is done using the specified filter. Accordingly, the contents of a printed material which has been output once can be reproduced by subsequent re-printing.

Since filter information associated with the hot folder can be edited, some filters can be easily changed on the basis of settings of past printing.

Modification

Filter history information is stored in a printer in the first embodiment, but may be stored in a host computer. In this case, when a filter history collection command is added to print data, filter information attached to the print data is not collected in the database of the printer, but sent back to the print data transmitting side. Upon reception of the filter information, the host computer manages it as filter history information. With this configuration, each host computer suffices to manage, as history information, only filter information used for print data transmitted by the host computer. Hence, no third party can check the filter history. The database of history information is shared between host computers to reduce the database scale. Even if a fault occurs, it can be prevented to lose all the history information.

When no designated folder module can be used, the folder module is obtained from a server, but may be stored in a printer or computer. In this case, a corresponding filter module itself is stored in the BOX 55 together with the filter information history. When filter information is designated and a print command is issued, the filter module itself is attached. The printer driver and printer controller first perform processing to execute attached filter module, and then perform filter processing. In order to restore a filter, a filter module to be replaced is stored in advance.

This configuration can attain the effects of the first embodiment even when the server does not store a filter of an old version.

The present invention may be applied to a system including a plurality of devices (e.g., a host computer, interface device, reader, and printer) or an apparatus including a single device (e.g., a copying machine or facsimile apparatus). The object of the present invention is achieved even by supplying a storage medium (or recording medium) which records software program codes to implement the functions of the above-described embodiment to the system or apparatus and causing the computer (or CPU or MPU) of the system or apparatus to read out and execute the program codes stored in the storage medium. In this case, the program codes read out from the storage medium implement the functions of the above-described embodiment by themselves, and the program codes and the storage medium which stores the program codes constitute the present invention.

The functions of the above-described embodiment are implemented not only when the readout program codes are executed by the computer but also when the operating system (OS) running on the computer performs part or all of actual processing on the basis of the instructions of the program codes. The functions of the above-described embodiment are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-043145, filed on Feb. 18, 2005, which is hereby incorporated by reference herein in its entirety.

What is claimed is:

1. A printing system comprising:
   a conversion unit which performs conversion processing for print data by using a filter module specified by filter information attached to the print data;
   a history storage unit which stores filter information for specifying the filter module used by said conversion unit;
   a filter re-designation unit which reads out the filter information stored by said history storage unit and attaches the filter information to the print data; and
   a filter designation unit which determines a filter module for use in accordance with a print setting and attaches, to print data, filter information for specifying the filter module,
   wherein the filter information attached by said filter designation unit does not contain version information, and the filter information attached by said filter re-designation unit contains version information, and
   when the filter information contains version information, said conversion unit performs print data conversion processing using a corresponding filter module of a corresponding version, and when the filter information does not contain version information, performs print data conversion processing using a filter module of a latest version.

2. A printing system comprising:
   a conversion unit which performs conversion processing for print data by using a filter module specified by filter information attached to the print data;
   a history storage unit which stores filter information for specifying the filter module used by said conversion unit;
   a filter re-designation unit which reads out the filter information stored by said history storage unit and attaches the filter information to the print data; and a unit which reads out the filter information stored in said history storage unit and stores the readout filter information in association with a specific file folder, wherein when a document data file to be printed is input to the specific file folder, said filter re-designation unit attaches the filter information which is stored in association with the specific file folder, to print data which is generated on the basis of the document data file.

3. A document management system capable of executing a print job for at least one printer, comprising:
- a driver filter information transmission unit which transmits, to a designated printer, driver filter information used by the print job in a printer driver when printing is executed;
- a filter information history storage unit which stores, in the printer, a filter information history including both the driver filter information transmitted by said driver filter information transmission unit and device filter information used by the print job in the printer;
- a filter information history obtaining unit which obtains the filter information history from the printer and stores the filter information history in the document management system; and
- a filter information history presentation unit which presents, to a user, the filter information history stored in the document management system, wherein when a print job is executed by designating said filter information history presentation unit, the print job is executed using a driver filter in the printer driver and a device filter in the printer in accordance with the held filter information history.

4. The system according to claim 3, wherein the driver filter or the device filter includes a module which performs layout conversion processing for an output result.

5. The system according to claim 3, wherein the driver filter or the device filter includes a module which performs stamping processing for an output result.

6. The system according to claim 3, wherein said filter information history presentation unit includes a hot folder.

7. The system according to claim 3, further comprising a filter information history setting change display control unit which controls display processing of accepting a change of a setting from the user on said filter information history presentation unit.

8. The system according to claim 7, wherein said filter information history setting change display control unit displays setting filter information as an icon for each filter.

9. The system according to claim 7, wherein said filter information history presentation unit displays a list of printers capable of implementing filters for use.

* * * * *